June 23, 1970 W. R. DETWILER 3,516,296
ADJUSTMENT MECHANISM FOR VARIABLE RATIO TRANSMISSION
Filed May 21, 1968 9 Sheets-Sheet 1

FIG. 1.

INVENTOR.
WILLARD R. DETWILER
By Flan and Flan
ATTORNEYS.

June 23, 1970  W. R. DETWILER  3,516,296
ADJUSTMENT MECHANISM FOR VARIABLE RATIO TRANSMISSION
Filed May 21, 1968  9 Sheets-Sheet 2

INVENTOR.
WILLARD R. DETWILER
BY Flam and Flam
ATTORNEYS.

INVENTOR.
WILLARD R. DETWILER
By Flam and Flam
ATTORNEYS.

June 23, 1970     W. R. DETWILER     3,516,296
ADJUSTMENT MECHANISM FOR VARIABLE RATIO TRANSMISSION
Filed May 21, 1968     9 Sheets-Sheet 5

INVENTOR.
WILLARD R. DETWILER
By Flam & Flam
ATTORNEYS.

June 23, 1970     W. R. DETWILER     3,516,296
ADJUSTMENT MECHANISM FOR VARIABLE RATIO TRANSMISSION
Filed May 21, 1968     9 Sheets-Sheet 6

INVENTOR.
WILLARD R. DETWILER

By Flam and Flam
ATTORNEYS.

INVENTOR.
WILLARD R. DETWILER
By Flam and Flam
ATTORNEYS.

June 23, 1970  W. R. DETWILER  3,516,296
ADJUSTMENT MECHANISM FOR VARIABLE RATIO TRANSMISSION
Filed May 21, 1968  9 Sheets-Sheet 8

INVENTOR.
WILLARD R. DETWILER
By Flam and Flam
ATTORNEYS.

United States Patent Office
3,516,296
Patented June 23, 1970

3,516,296
ADJUSTMENT MECHANISM FOR VARIABLE RATIO TRANSMISSION
Willard R. Detwiler, Lawndale, Calif., assignor to Emerson Electric Co., St. Louis, Mo.
Filed May 21, 1968, Ser. No. 730,798
Int. Cl. F16h 55/52
U.S. Cl. 74—230.17                     34 Claims

ABSTRACT OF THE DISCLOSURE

A slidable pulley section of a variable ratio transmission is adjusted on its shaft to change the transmission ratio by the aid of an auxiliary reversible transmission. The auxiliary transmission connects the shaft itself to the slidable pulley section, and includes parts physically movable into and out of engagement with companion elements of the auxiliary transmission for selectively operating the auxiliary transmission in a selected direction. The auxiliary transmission is idle and deactivated when the movable parts are retracted.

BRIEF SUMMARY OF THE INVENTION

This invention relates to variable ratio transmission mechanisms, particularly of the type utilizing variable diameter pulley structures such as shown in U.S. Letters Patent No. 3,250,141. In such mechanisms, an input shaft carries a pair of opposed conical pulley sections, one being fixed on the shaft and the other slidable on the shaft whereby the effective pulley diameter is changed in a well understood manner.

In the past it has been common to use a movable linkage mounted on the frame and which transmits axial thrust to the movable pulley section through some form of rotary bearing structure. The rotary bearing structure allows the linkage to be non-rotary and yet operate upon the rotary pulley section. A substantial effort may be required to accomplish the adjustment. Larger transmissions may require auxiliary motors or gear reduction mechanisms.

The primary object of this invention is to provide an improved system for adjusting the transmission in which the power necessary to accomplish the adjustment is conveniently derived from the transmission itself.

Another object of this invention is to provide a system for adjusting a variable ratio transmission in which the constant frictional drag between the transmission and the adjustment mechanism is eliminated. For this purpose the power train for accomplishing the adjustment is physically connected only when an adjustment is desired. Accordingly, wear and power losses are reduced with consequent increased mechanical efficiency.

Another object of this invention is to provide a system of this character comprising compactly arranged frame and power shaft carried components, and in which the frame carried components may conveniently be attached to a frame cap.

This invention possesses many other advantages and has other objects which may be made more clearly apparent from a consideration of several embodiments of the invention. For this purpose, there are shown a few forms in the drawings accompanying and forming part of the present specification, and which drawings are true scale. These forms will now be described in detail illustrating the general principles of the invention. Structural and operational characteristics attributed to forms of the invention first described shall also be attributed to forms later described, unless such characteristics are obviously inapplicable or unless specific exception is made.

It is to be understood that the following detailed description is not to be taken in a limiting sense, since the scope of the invention is best defined by the appended claims.

DETAILED DESCRIPTION

Figure 1:
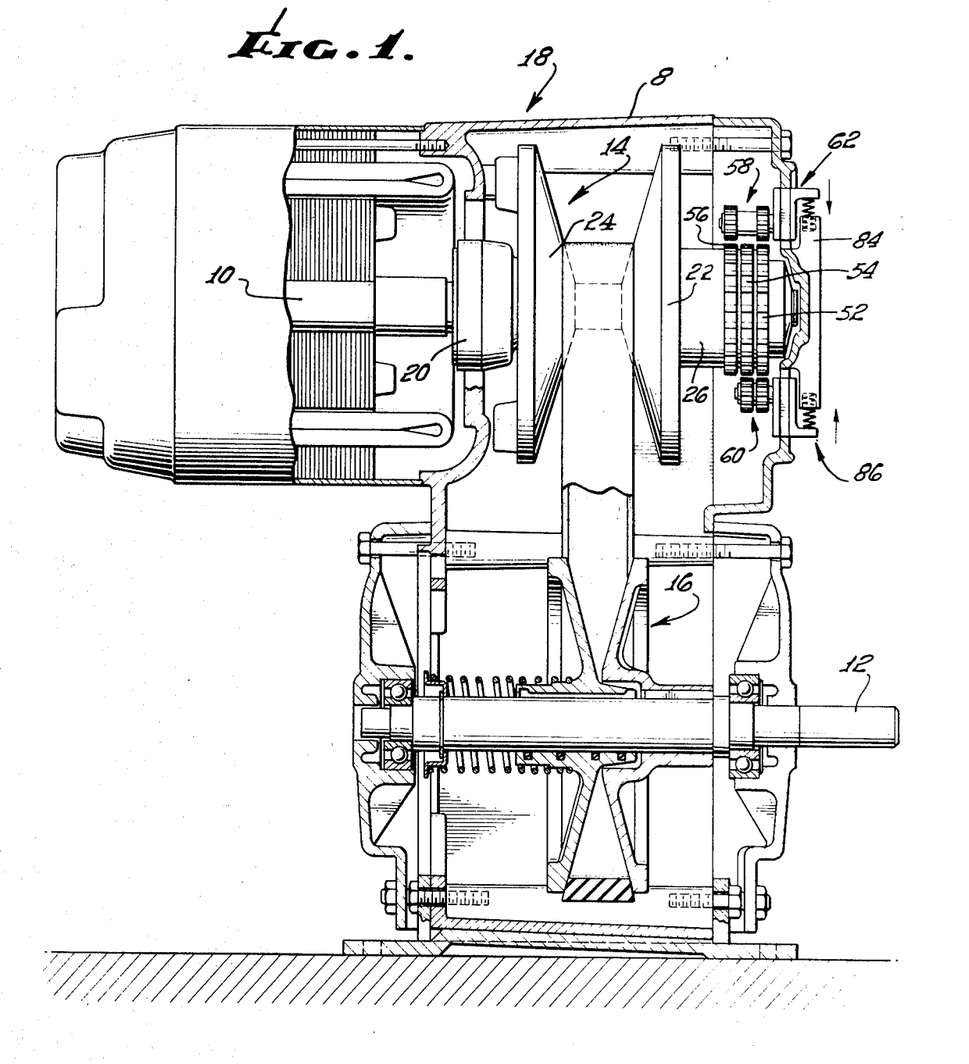
FIG. 1 is a fragmentary sectional view of a variable ratio transmission mechanism incorporating the present invention.

The variable ratio transmission mechanism shown in FIG. 1 includes a case 8, an input shaft 10, an output shaft 12, and a pair of variable diameter pulley structures 14 and 16 carried by the shafts. The shaft 10 in this instance is motor driven. It projects into the upper part of the casing 18 where it is supported by a bearing 20, the inner or right hand end of the shaft being free.

The pulley structure 14 comprises two opposed conical pulley sections 22 and 24. Both rotate with the shaft 10. The pulley section 24 is at a fixed axial position, whereas the pulley section 22 may be moved toward and away from the companion pulley section 24. By such means the effective diameter of the pulley structure 14 is varied, all in a well understood manner. The pulley structure 16 adjusts its effective diameter automatically.

Figure 2:
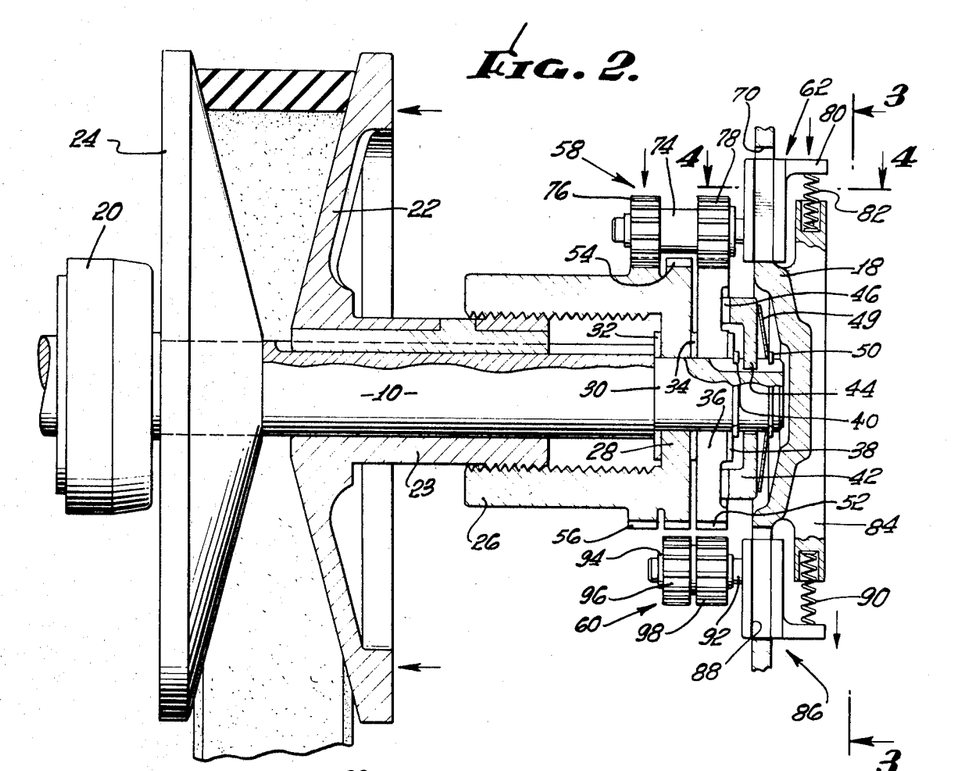
FIG. 2 is an enlarged fragmentary sectional view of those parts of the transmission mechanism comprising the auxiliary transmission for shifting the slidable pulley section.

As shown in FIG. 2, the pulley section 22 has a threaded hub 23 that engages a companion internally threaded sleeve or collar 26. The collar is mounted on the shaft 10 and normally rotates with the pulley section 22. For this purpose the collar has a flange 28 located on a reduced end portion 30 of the shaft. The collar is confined between washers 32 and 34 on opposite sides. While the collar rotates with the pulley section, the shoulder at the reduced portion 30 axially locates the collar.

In order to shift the axial position of the pulley section 22, relative angular movement is imparted between the collar 26 and the hub 23. For this purpose, an auxiliary transmission is provided between a driver or actuator carried with the shaft 10 and the collar 26.

Figure 7:
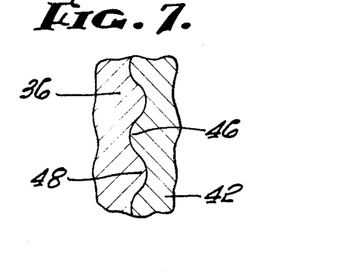
FIG. 7 is an enlarged fragmentary sectional view taken along the plane indicated by line 7—7 of FIG. 5.

The actuator or driver has two parts serially connected by an overload clutch. One part is a plate 36 journalled on the reduced extension 30 adjacent the collar 26. It is confined between the washer 34 and a third washer 38. A snap ring 40 holds the plate 36, collar 26 and the washers 32, 34 and 38 against the shoulder at the inner end of the shaft section 30. The second part of the driver is a plate 42 slidably keyed to the shaft section 30 adjacent the plate 36 as by an integral projection 44. The plates 36 and 42 have companion clutch teeth 46 and 48 (see also FIG. 7) that extend circularly. The driver parts are urged together by the aid of a Belleville spring 49 held on the shaft by a snap ring 50.

The driver is selectively coupled to the collar 26 by the aid of one of two gear drive devices. The driver plate 36 has peripheral gear teeth 52 common to both gear devices, and forming the first element of both gear devices. Side-by-side sets of gear teeth 54 and 56 formed peripherally of the collar 26 form the final elements of the two gear devices. All gears sets 52, 54 and 56 have the same diameter. An idler gear assembly 58 selectively connects the collar gear 52 with one of the gear sets 56, and an idler gear assembly 60 selectively connects the collar gear 52 with the other of the gear sets 54. The assemblies 58 and 60 are the control means for the gear drive devices.

The number of teeth of the set 56 is greater than the number of teeth in the driver set 52. For example, there may be forty-eight teeth on the driver set 52 and forty-nine on the set 56. Accordingly, by coupling the sets 52 and 56 in one-to-one relationship, the collar 26 is caused to lag slightly behind the driver plate 36.

Figure 4:
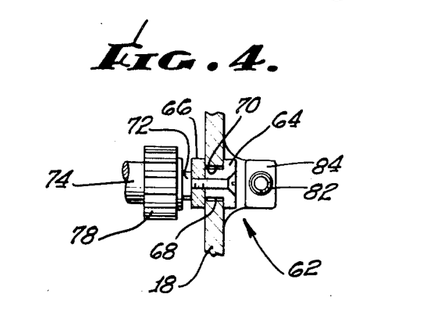
FIG. 4 is a fragmentary sectional view taken along a plane corresponding to line 4—4 of FIG. 2.

The idler gear assembly 58 couples the gear sets 52 and 56 in one-to-one relationship. This assembly includes a support 62 slidable on the end bracket of the frame 18. The support 62 as shown in FIG. 4 includes companion parts 64 and 66 defining grooves 68 on opposite sides. These grooves 68 fit a radially extending slot 70 on the frame. A mounting post or shaft 72 projects from the part 66. A sleeve 74 is journalled on the post and carries pinions 76 and 78 positioned respectively to engage the gear sets 52 and 56. The pinions 76 and 78 have the same number of teeth.

By moving the support 62 toward the axis of the shaft 10, the gear train is operative. For moving the support 62, a lever 80 is provided that extends on the outside of the frame. A compression spring 82 carried at the end of a bar 84 normally urges the support 62 away from engagement. When the gear train is operative, the collar 26 is retarded and the pulley section 22 is accordingly moved in one direction.

The idler gear assembly 60 is similar. It includes a support 86 like support 62, but located on the opposite side of the main shaft axis. The support fits a slot 88 and is urged to a disengaged position by a spring 90. A post or shaft 92, carried by the slider 66, rotatably mounts a sleeve 94 that in turn carries two pinions 96 and 98. The pinions 96 and 98 are positioned respectively to engage the gear sets 52 and 54. The number of teeth in the gear set 54 is less than the teeth on the set 52. For example, the gear set 54 may have forty-seven teeth. Accordingly, when the gear train is operated, the collar is advanced relative to the motion of the shaft 10 and the pulley section 22 is moved in the opposite direction.

In the even that undue resistance is encountered to rotation of the collar 26 as, for example, by movement of the pulley section 22 to a limited position, the clutch teeth will yield. The clicking noise indicates the fact that the pulley section is at a limited position.

Figure 3:
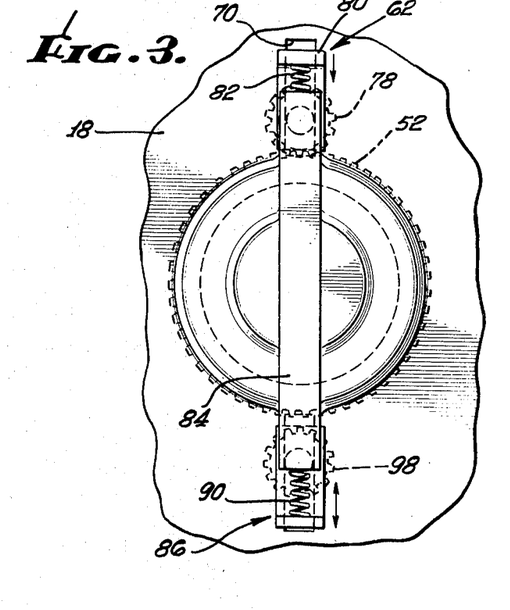
FIG. 3 is a fragmentary end view taken along a plane indicated by line 3—3 of FIG. 2, the gear mechanisms being shown in dotted lines.
Figure 5:
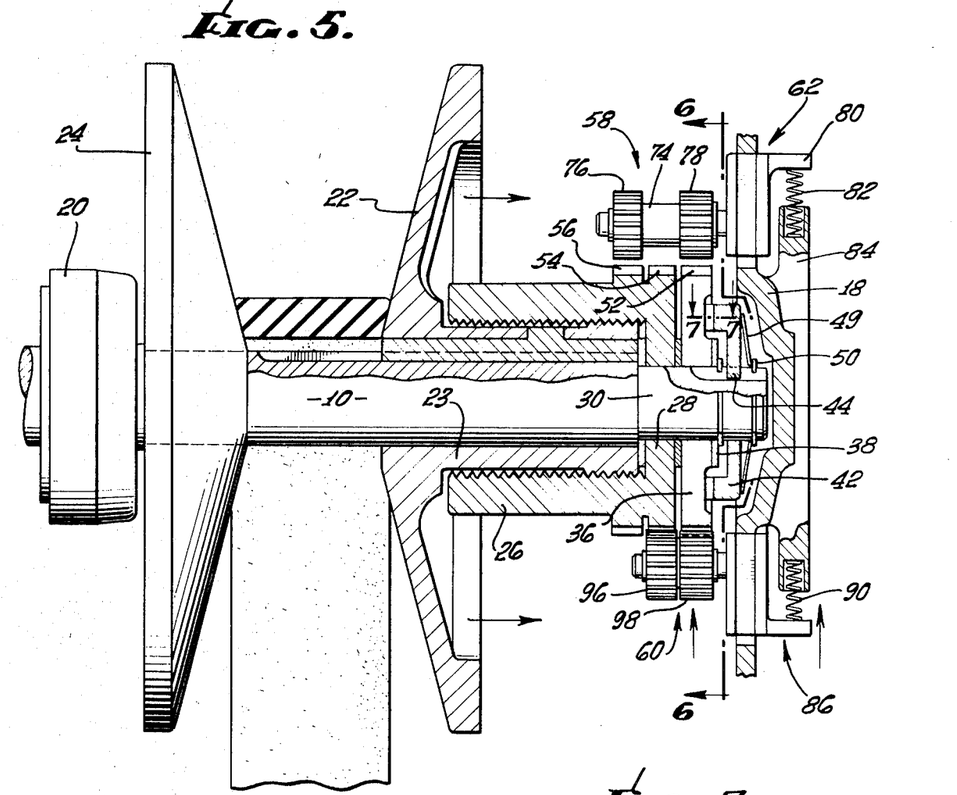
FIG. 5 is a view similar to FIG. 2 but showing the parts in another operative relationship.
Figure 6:
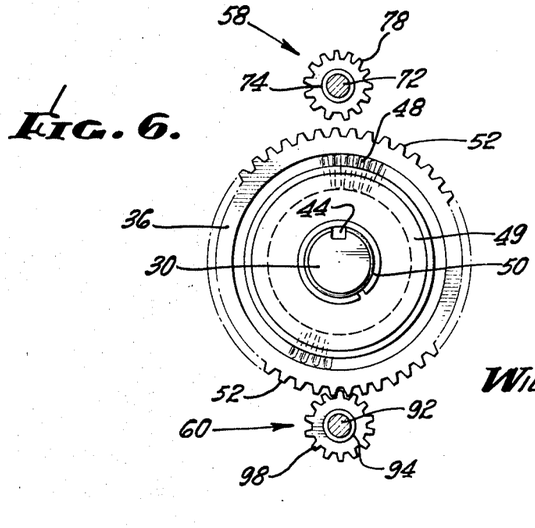
FIG. 6 is a transverse sectional view taken along a plane corresponding to line 6—6 of FIG. 5.

In FIGS. 2 and 3 the idler gear assembly 58 is in operative position and the pulley section 22 has been moved to its inwardmost limit corresponding to maximum pulley diameter. In FIGS. 5 and 6, the idler gear assembly 60 is in operative position and the pulley section 22 is at its outwardmost limit. Any intermediate position may be achieved by suitable control of the idler gear assemblies.

The gear mechanisms are designed to withstand the impact of coupling. However, they need not be designed to transmit large power. The clutch mechanism protects the gear structures from excessive torque.

In the form shown in FIGS. 8 to 11, a movable pulley section 100 is keyed to the shaft 102 as in the previous form. The hub 104 has a flange 106 that rides upon a pair of lead screws 108 and 110. The lead screws 108 and 110 are journalled in an axially fixed plate 112. The plate 112 is keyed to the shaft 102 as at 114. The lead screws normally do not rotate about their own axes, whereby the axial position of the pulley section is moved. For this purpose, the ends of the lead screws 108 and 110 carry bevel gears 116 and 118. Planetary motion is selectively imparted to the lead screws 108 and 110 by the aid of a pair of actuators or control means in the form of ring gears 120 and 122.

Figure 8:
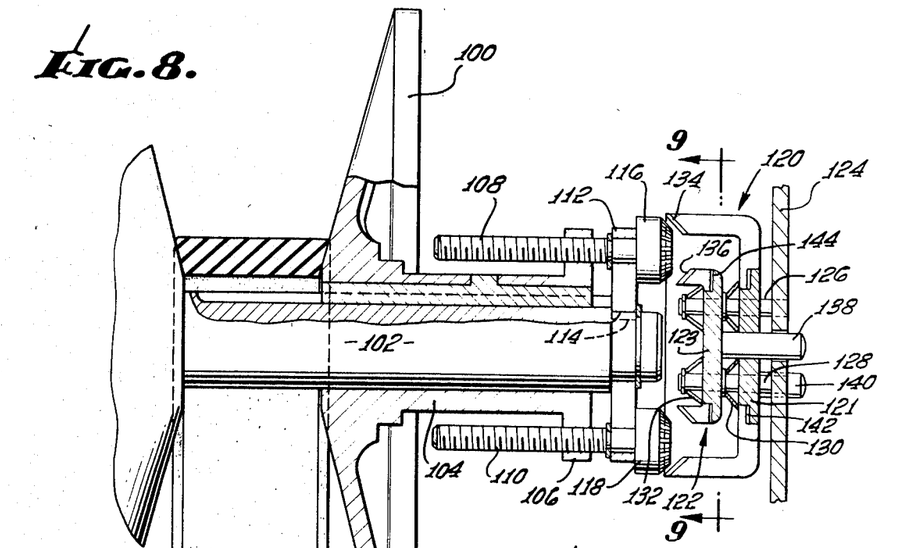
FIG. 8 is a sectional view similar to FIG. 2 showing a modified form of the present invention.
Figure 9:
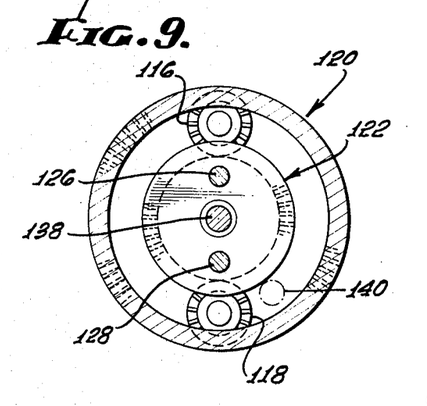
FIG. 9 is a sectional view taken along the plane corresponding to line 9—9 of FIG. 8.
Figure 10:
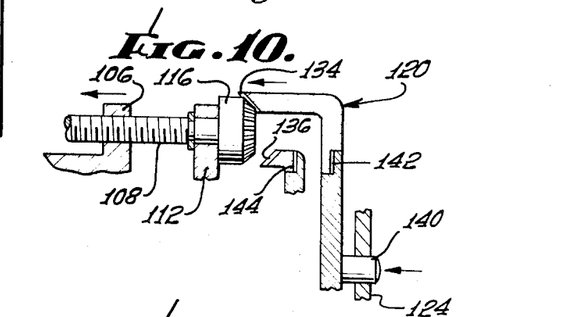
FIGS. 10 and 11 are fragmentary sectional views of part of the apparatus shown in FIG. 8, but illustrating the parts in different operative relationships.
Figure 11:
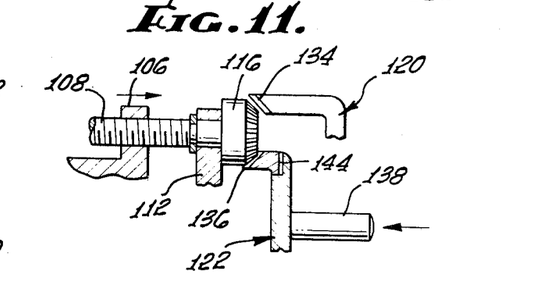
Figures 12, 13, 14, 15:
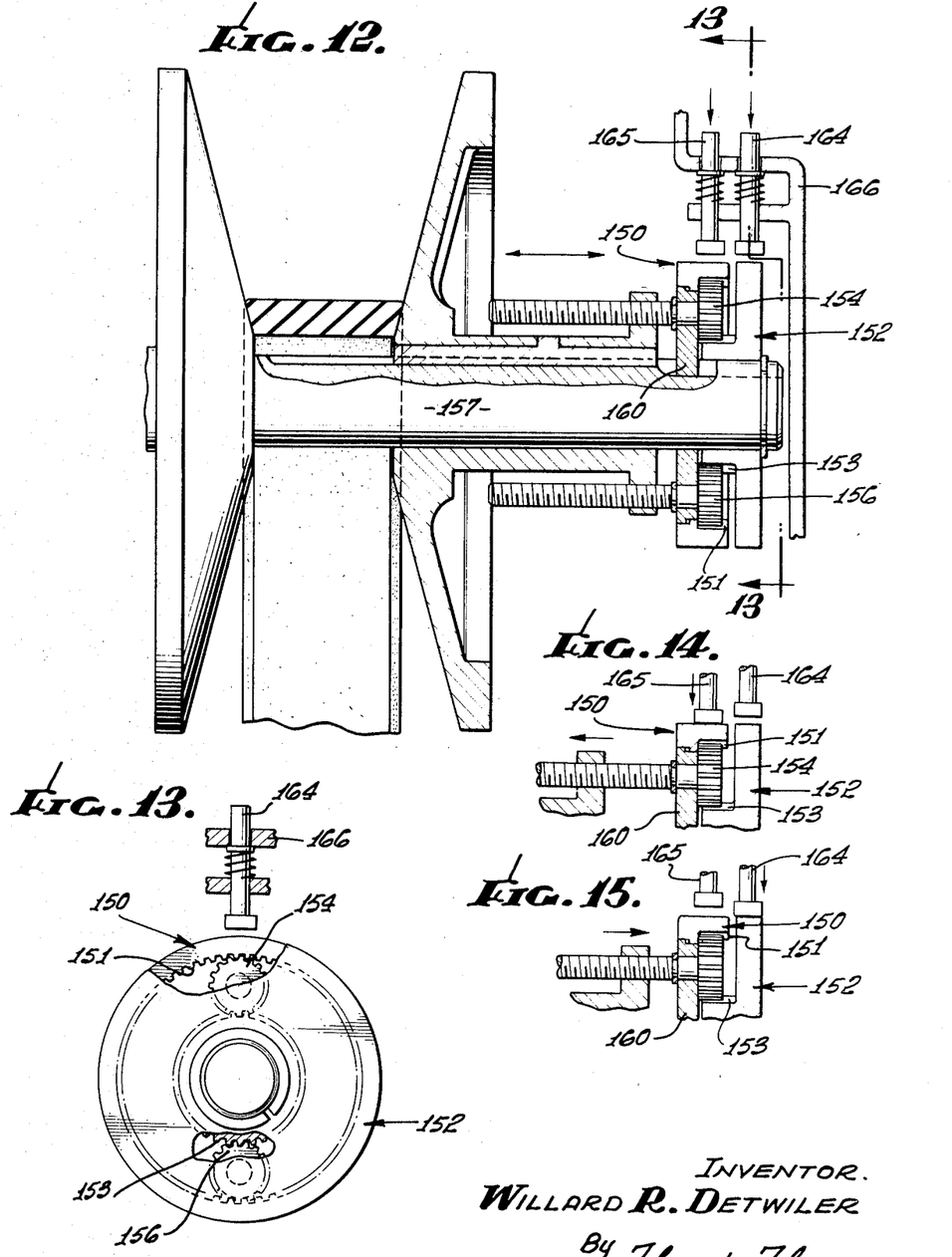
FIG. 12 is a sectional view similar to FIGS. 2 and 8 showing another modified form of the present invention.
FIG. 13 is a fragmentary sectional view taken along the plane corresponding to line 13—13 of FIG. 12.
FIGS. 14 and 15 are fragmentary sectional views of part of the apparatus shown in FIG. 12, but illustrating the parts in different operative relationships.

The ring gears 120 and 122 are mounted on the frame 124 for separate axial movement from retracted disengaged positions to projected operative positions. For this purpose, the ring gears 120 and 122 have hub parts 121 and 123 slidably mounted on a pair of mounting posts 126 and 128. These posts project inwardly from the frame 124. The hub parts 121 and 123 are located in spaced side-by-side relationship. Pairs of Belleville springs 130 and 132 seated on pairs of snap rings normally urge the gears to their retracted positions.

The gears 120 and 122 have concentric sets of beveled teeth 134 and 136 positioned to engage the outside and inside elements of the planetary gears 116 and 118. The inner gear 122 is moved inwardly to operative position by the aid of a push button 138 that projects outwardly of the frame 124. Upon such movement (FIG. 11) the inner elements of planetary gears 116 and 118 are engaged and the lead screws rotate in one direction. The outer gear 120 carries a push button 140 (see FIG. 9) accessible laterally of the button 138. Inward movement of the gear 120 causes the outer elements of the gears 116 and 118 to be engaged whereby the lead screws are moved in the opposite direction. The position of the pulley section may be accordingly controlled.

Clutch teeth as at 142 and 144 are provided between the inner and outer parts of the gears for torque limiting purposes. The retracting springs 130 and 132 act on the outer parts yieldably to maintain the clutch parts in engagement as the push buttons are operated. Power for operating the lead screws is derived from the shaft 102 as in the previous form.

The form shown in FIGS. 12 to 15 is similar to that shown in the previous form except that control means in the form of friction devices are used to retard rather than to stop the actuators 150 and 152. The actuators, in this instance, have internal and external ring gears 151 and 153 that continually engage the lead screw gears 154 and 156. However, the actuators normally rotate with the shaft 157. For this purpose, the inside actuator 152 has a hub part journalled on the shaft 157. The other actuator is journalled on the stepped periphery of the lead screw mounting plate 160.

Both actuators have peripheral surfaces positioned to be engaged by friction brake members 164 and 165 retractably mounted on the transmission case or frame 166. The brake members are in the form of simple plungers spring-pressed to retracted positions. Upon inward movement of a plunger (FIGS. 14 and 15), the corresponding actuator is retarded and planetary movement of the lead screws results. Depending upon which plunger is operated, the pulley section is moved inwardly or outwardly. The degree of pressure on the actuators determines the extent that they are retarded and, hence, the speed of the adjustment. By exerting a light pressure, the lead screws are moved slowly. A fine adjustment can be achieved by light pressures exerted for short times.

Figure 16:
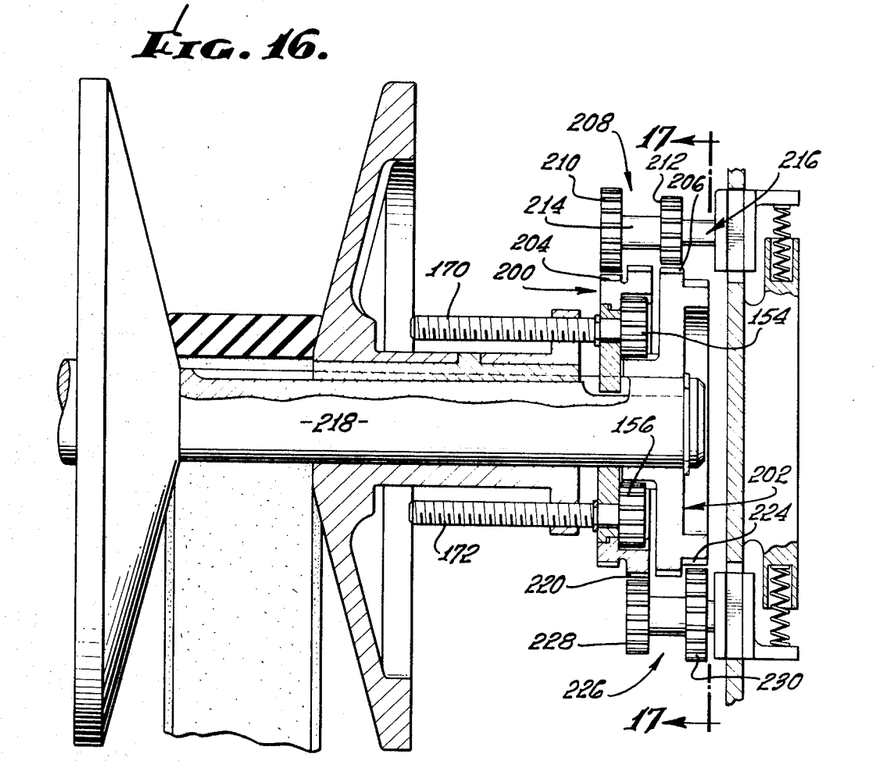
FIG. 16 is a sectional view similar to FIGS. 2, 8 and 12 showing another modified form of the present invention.
Figure 17:
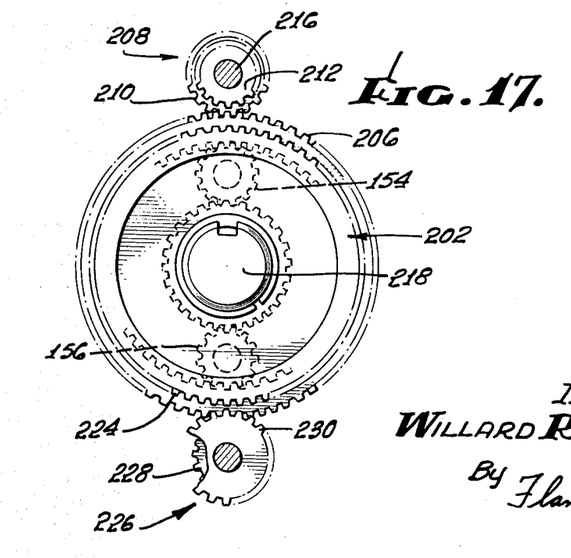
FIG. 17 is a fragmentary sectional view taken along a plane corresponding to line 17—17 of FIG. 16.

A sensitive adjustment may also be accomplished by the aid of the mechanism shown in FIGS. 16 and 17. External and internal actuators or ring gears 200 and 202 are provided that are generally similar to the actuators 150 and 152 of the previous form, except that the peripheral surfaces have sets of gear teeth. Pinions or planetary gears 154 and 156 are provided as in the previous form, together with their lead screws 170 and 172.

In order to rotate the lead screws, a slight differential movement is imparted between the actuators 200 and 202. For causing differential rotation in one direction, the gear sets 204 and 206 of the actuators 200 and 202 are coupled. Control means in the form of an idler gear assembly 208 is provided for this purpose. The assembly includes pinions 210 and 212 carried at ends of a sleeve 214 journalled on a bracket 216. The bracket 216 is similar to that shown in the form of FIGS. 1 to 7. The gear set 206 has, one or two more teeth than the gear set 204, say sixty-two teeth as against sixty, and the pinion 212 has, say, eighteen teeth whereas the pinion 210 has twenty teeth. For every revolution of the sixty-tooth gear 204, three revolutions are imparted to the pinions. Consequently, a total of fifty-four teeth of the gear set 206 will be indexed. Accordingly, the actuator 202 will move slower than the actuator 200 by the ratio of 10%. The actuators will be carried along with the main shaft 218 by the planetary gears 154 and 156. The lead screws 170 accordingly are moved in one direction at a small rate of speed.

Similar sets of teeth 220 and 224 are provided that cooperate with an idler gear assembly 226. The gear sets 220 and 224 together with the pinions 228 and 230 cause a 10% speed differential in the opposite direction. By selecting the appropriate idler gear assembly and controlling the time of engagement, a fine adjustment can be achieved.

Figures 18, 20:
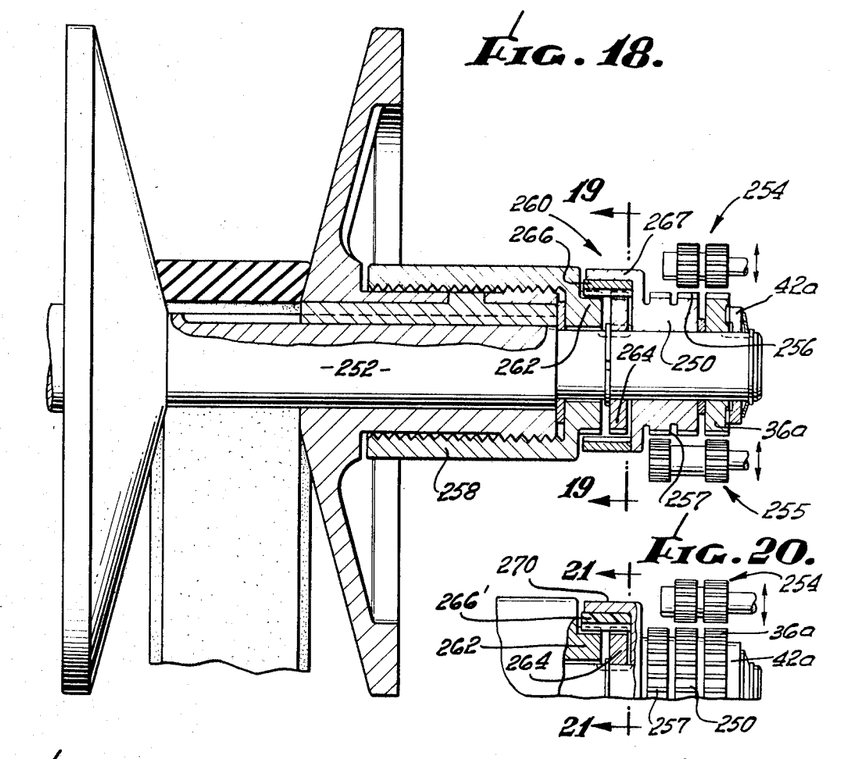
FIG. 18 is a sectional view similar to FIGS. 2, 8, 12 and 16 showing another modified form of the present invention.
FIG. 20 is a fragmentary view showing part of the apparatus of FIG. 18, but with a flexible ring gear and operator substituted.
Figure 21:
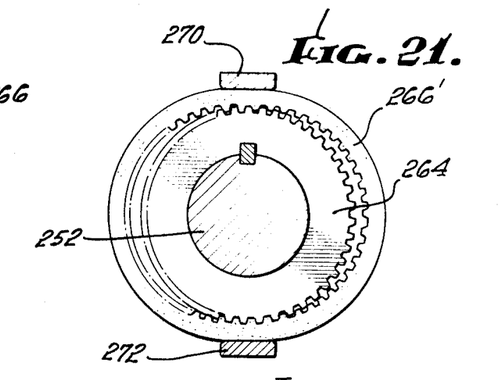
FIG. 21 is a sectional view taken along a plane indicated by line 21—21 of FIG. 20.

The two forms illustrated in FIGS. 18 and 21 are somewhat similar to the form shown in FIGS. 1 to 7, except that an additional stage of gear reduction is provided in order to reduce the speed of adjustment and to increase sensitivity.

A two-part actuator or driver 36a, 42a is provided that corresponds to the driver 36, 42 of the form in FIGS. 1 to 7. An intermediate transmission member 250 journalled on the shaft 252 can be rotated at an increased or decreased speed relative to the shaft 252 and the driver. This is achieved by control means comprising a pair of idler gear assemblies 254 and 255 that cooperate respectively with sets of gear teeth 256 and 257. A collar 258 adjustably carries the hub of the movable pulley section. The collar 258 is operatively connected to the intermediate transmission member 250 by the aid of a gear reduction mechanism 260.

Figure 19:
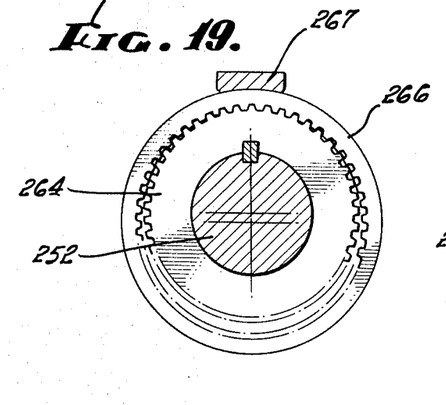
FIG. 19 is an enlarged fragmentary sectional view taken along a plane corresponding to line 19—19 of FIG. 18.

The gear reduction mechanism 260 includes companion spur gear sections 262 and 264. The gear section 262 is formed on the collar and the gear section 264 is formed on a separate plate keyed to the shaft 252. Both are axially fixed. The gear sections 262 and 264 have a slightly different number of teeth. A floating oversized ring gear 266 meshes with both gears (see also FIG. 19). The ring gear is held in engagement at one place about the periphery by the aid of a bar 267 attached to the member 250.

When the idler gear assemblies are retracted, the transmission member 250 rotates with the shaft 252. Accordingly, the ring gear 266 carries the collar 258 along and the axial position of the pulley section remains fixed. When one of the idler gear assemblies 254 or 255 is operated, the eccentric ring gear 266 progressively engages along the gears 262 and 264 resulting either in a slight increase in speed of the collar 258 or a slight decrease, depending upon which gear assembly is operated. Adjustment is thus accomplished.

In the form illustrated in FIGS. 20 and 21, the eccentric 266' is in the form of a flexible gear that engages gears 262 and 264 two places spaced 180° apart. In this instance, two bars 270 and 272 cause appropriate engagement. Since the gear 266' engages at two places, proper meshing is achieved by the various gears having even added numbers of teeth.

Figure 22:
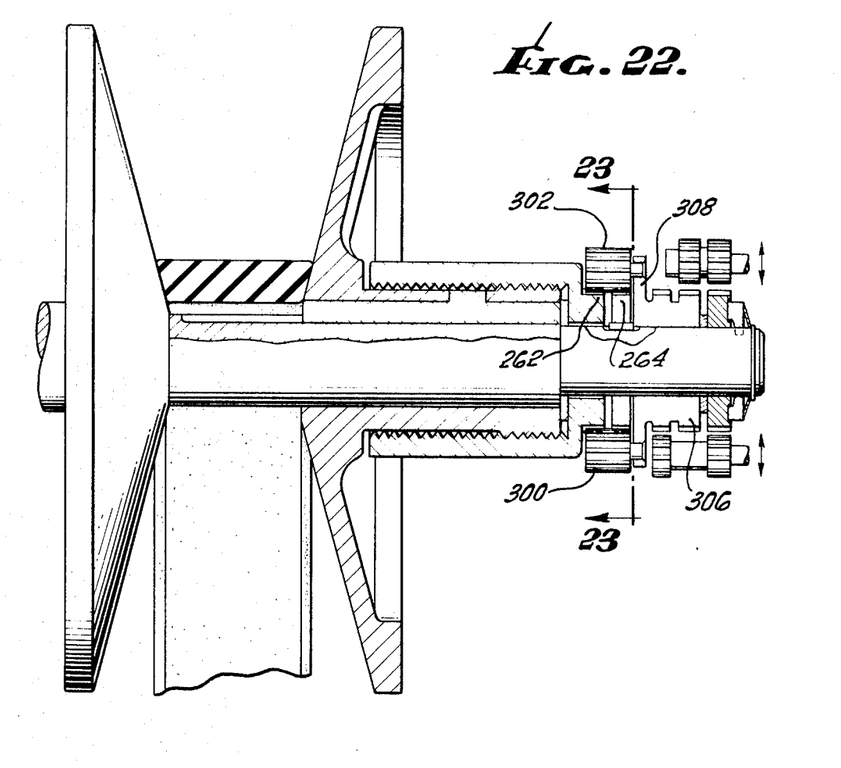
FIG. 22 is a sectional view similar to FIG. 18, but with a different gear reduction mechanism.
Figure 23:
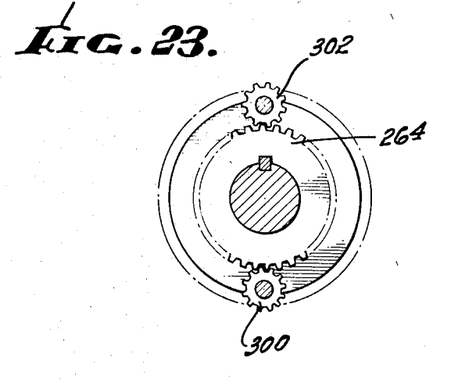
FIG. 23 is a sectional view taken along the plane corresponding to line 23—23 of FIG. 22.

The form of the invention illustrated in FIG. 22 is similar to those shown in FIGS. 18 to 21. Instead of an eccentric ring gear, a pair of planetary pinions 300 and 302 are provided that engage the gear sets 262 and 264. The intermediate transmission member 306 has a flange 308 that mounts the planetary gears 300 and 302. Idler gear assemblies are provided as before.

Figures 24, 25, 26:
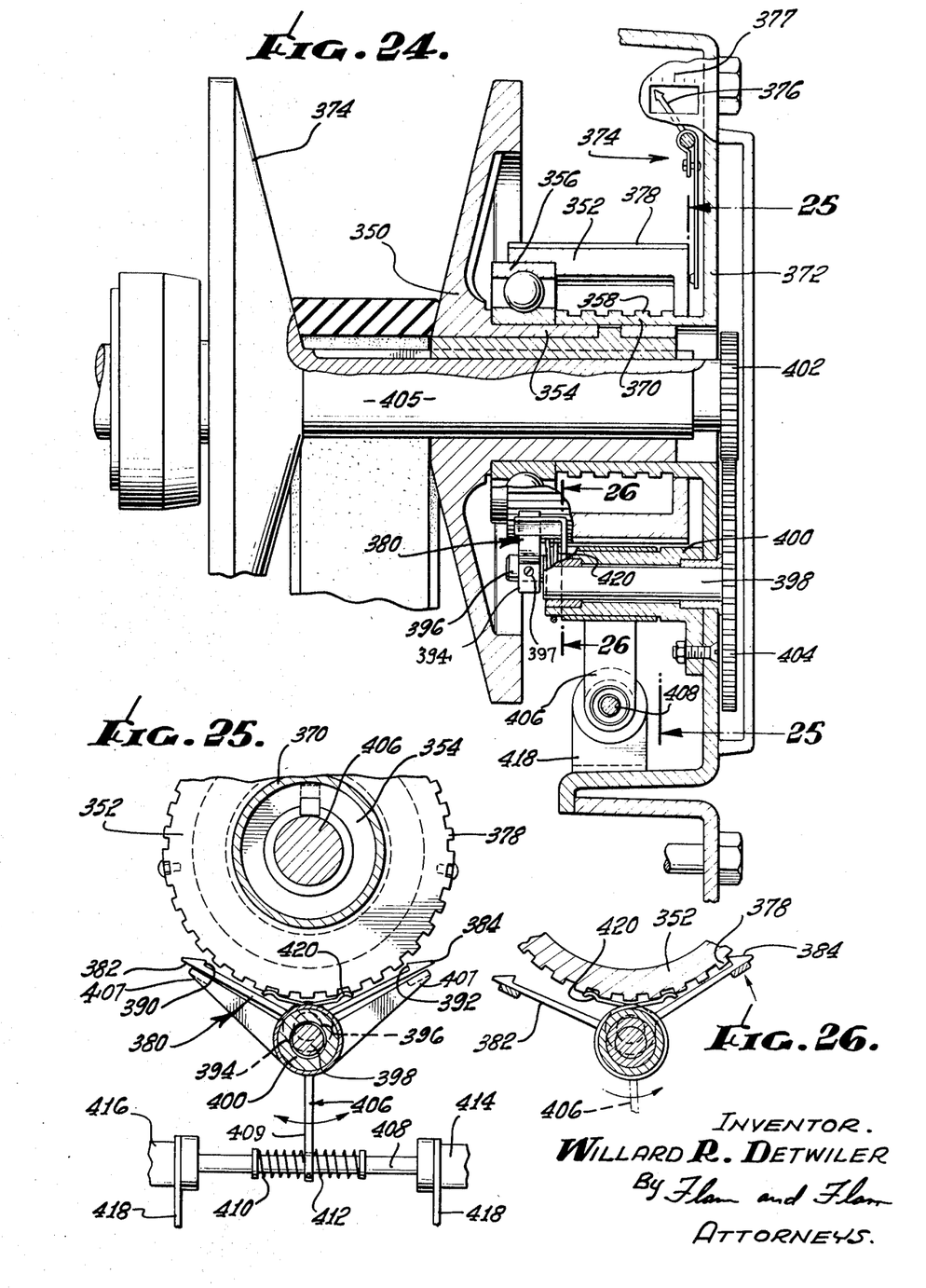
FIG. 24 is a sectional view similar to FIGS. 2, 8, 12, 16 and 18 showing another modified form of the present invention.
FIGS. 25 and 26 are fragmentary sectional views taken along planes corresponding to lines 25—25 and 26—26 of FIG. 24, FIG. 26 illustrating the parts in a different operating position.

In the form illustrated in FIGS. 24 to 26, the pulley section 350 is moved axially by a collar 352 that surrounds the pulley section hub 354. The collar 352 is non-rotary. Accordingly, in order to establish a coupling, a roller bearing structure 356 is provided. The inner race of the bearing is mounted at the base of the pulley section hub 354. The outer race is accommodated in a recess at the inner end of the collar 352.

The collar 352 is mounted upon peripheral jack threads 358 of a hollow post 370 that extends inwardly of the transmission case 372. The hollow post surrounds the hub 354 with suitable running clearance. By movement of the collar 352 inwardly, the pulley section 350 is caused correspondingly to move toward the companion pulley section 374 to provide an increase in pulley diameter. By movement of the collar 352 outwardly, the pulley section 350 follows under the influence of belt tension. The position of the pulley section 350 is indicated by the aid of a linkage 374 that engages the end flange of the collar 352. The linkage includes an indicator 376 visible exteriorly of the transmission case 372. The indicator 376 cooperates with suitable gauge markings 377.

In order to move the collar 352, a ratchet mechanism is provided. Part of the ratchet mechanism includes ratchet teeth 378 (see also FIG. 25) formed peripherally of the collar 352. The rachet teeth 378 are selectively cooperable with a double pawl structure 380 that forms the means for controlling the auxiliary drive for the pulley section 350. The pawl structure 380 is in the form of a bell crank lever having pawl elements 382 and 384 at opposite ends.

The pawl elements 382 and 384 have surfaces 390 and 392 facing in opposite directions and adapted to engage the ratchet teeth 378.

The pawl structure 380 has a hub 394 (see also FIG. 24) that is journalled upon an eccentric pin 396 in turn carried at the end og a countershaft 398. The pawl structure 380 is held on the shaft by the aid of a pin 397 that works in an annular groove. The countershaft 398 is mounted upon the transmission case 372 beneath the collar 352. The shaft 398 is carried in a suitable bearing bracket 400 and it is rotated by the aid of gears 402 and 404 carried by the main shaft 405 and the countershaft 398 respectively.

If the pawl structure 380 is held substantially in a central position as viewed in FIG. 25, the pawl structure 380 undergoes a circular orbit that clears the teeth 378. However, upon movement of the pawl structure 380 angularly in one direction or the other about the pin 396, the orbit of the pawl structure 380 is shifted, resulting in ratchet operation. The direction of the ratcheting depends upon the direction that the pawl structure is shifted. Thus, angular movement of the pawl structure 380 in a counterclockwise direction (FIG. 26) causes the pawl element 384 to be operatively positioned. Similarly, upon opposite movement of the pawl structure 380, the pawl element 382 is caused to be operative.

For angularly moving the pawl structure 380, a shifter 406 is provided. The shifter has a hub mounted about the bracket 400 (FIG. 24) for angular movement. The shifter 406 has arms 407 underlying the pawl elements 382 and 384 so that angular movement of the shifter operatively positions one of the pawl elements. The shifter has a depending arm 409 by the aid of which it is angularly moved. A post 408 passes with clearance through a hole in the arm 409. Springs 410 and 412 carried on the post hold the arm 409 centrally of the post. When the post itself is in a neutral or central position, the shifter is likewise in a neutral or central position and neither pawl element is operative.

The post 408 may be selectively moved in either direction by the aid of a pair of small solenoids 414 and 416. The solenoids are mounted on a bracket 418 attached to the case or frame 372. Energization of a selected solenoid 414 or 416 tilts the pawl structure to achieve ratcheting movement. In the present form, the direction that the pulley section moves is independent of the direction of shaft rotation.

The power for operating the collar 352 and for shifting the pulley structure is derived from the main shaft 405 via gears 402 and 404. Application of power from an external source is obviated as in the previous forms.

An anti-creep spring 420 is fastened to the bracket 400 and has ends provided with detents for normally holding the collar against movement.

In place of the solenoids 414 and 416, manual power can be applied as by extending the arm 409 outwardly of the casing. Furthermore, solenoids similar to solenoids 414 and 416 may be operatively connected to the shifting mechanisms of the previous forms.

I claim:

1. In a variable ratio transmission mechanism having a frame, a power shaft and a member rotatably coupled to the shaft, said member being movable along the shaft for adjusting the ratio of transmission, the combination therewith of: auxiliary reversible drive means; means connecting the drive means between the member and the power shaft for moving said member along the shaft, said drive means including means carried by the frame selectively movable into and out of engaged relationship with companion parts of said drive means whereby the power for operating said drive means is derived from said power shaft only when said selectively movable means is in engaged relationship.

2. The combination as set forth in claim 1 in which said auxiliary drive means includes a pair of differential gear sets between the power shaft and the member, and in which a retractable idler gear assembly for each of the sets together comprise the said selectively movable means.

3. The combination as set forth in claim 2 in which each of said idler gear assemblies is mounted by said frame for limited movement in a path, and spring means for urging the gear assemblies to disengaged position.

4. The combination as set forth in claim 3 in which each of said idler gear assemblies has a part accessible exteriorly of the frame for digital actuation.

5. The combination as set forth in claim 1 in which said auxiliary drive means includes a normally engaged clutch moved to disengaged position in response to a predetermined torque load.

6. The combination as set forth in claim 1 in which said auxiliary drive means includes planetary gears carried for rotation with said power shaft, movement of said planetary gears about their axes serving to move said member axially of said power shaft; a pair of ring gears respectively cooperable with the inside and outside elements of said planetary gears; said selectively movable means producing tracking of said planetary gears along said ring gears in a selected direction only upon movement of said means to engaged position.

7. The combination as set forth in claim 6 in which said ring gears are journalled on said shaft and normally rotate with said planetary gears; said movable means selectively retarding one of said ring gears.

8. The combination as set forth in claim 6 in which said ring gears are journalled on said shaft; and a pair of differential gear sets between said ring gears; said selectively movable means including a pair of idler pulley assemblies respectively engageable to complete gear trains between the differential gear sets to impart a differential rotational movement between the ring gears in a selected direction.

9. The combination as set forth in claim 6 in which said ring gears are journalled on said shaft, and each have annular surfaces; said selectively movable means including a pair of retractable brakes respectively engageable with the annular surfaces of said ring gears.

10. The combination as set forth in claim 9 in which said ring gears comprise the selectively movable means mounted by said frame.

11. The combination as set forth in claim 10 in which each of said ring gears has a part accessible exteriorly of the frame for digital actuation; and spring means urging the ring gears to disengaged positions.

12. The combination as set forth in claim 1 in which said auxiliary drive means include a pair of differential transmissions each having an element connected to said shaft, a second element connected to said member, and a third floating element normally movable with said first and second elements; said selectively movable means being engageable with third elements of said differential transmissions respectively to impart differential movement between the first and third elements.

13. The combination as set forth in claim 12 in which common gear carried by said shaft forms the first elements of said differential transmissions.

14. The combination as set forth in claim 1 in which said auxiliary drive means includes a non-rotary thrust member threadedly mounted on said frame for movement parallel to said shaft; a bearing for coupling the thrust member to said shaft-carried member; said thrust member having circularly extending ratchet teeth; a pawl cooperable with said ratchet teeth; means operated by said shaft for imparting oscillatory movement to said pawl; and means selectively positioning said pawl for movement in alternate operative paths for indexing said thrust member in opposite directions and for positioning said pawl for movement in a path in which the pawl is out of engagement from said ratchet teeth.

15. The combination as set forth in claim 14 in which said pawl has a pair of oppositely acting spaced pawl elements; said means for imparting oscillatory movement to said pawl including an eccentrically movable means to impart non-rotary orbital movement to said pawl; spring means determining a normal angular orientation of said pawl in which said elements move in orbital paths clearing the ratchet teeth; and means selectively tilting the pawl in opposite directions to cause the corresponding pawl element to move in an orbital path to effect corresponding ratchet movement of said thrust member.

16. The combination as set forth in claim 15 together with spring detent means normally restraining movement of said thrust member.

17. In a variable ratio transmission mechanism having a frame and a power shaft, the combination therewith of a pulley section rotatably coupled to the power shaft; said pulley section having a hub; an axially fixed jack screw rotatably mounted on the shaft and threadedly coupled to said hub for moving the pulley section axially upon relative movement between the jack screw and the pulley section; auxiliary transmission means connected between the jack screw and the power shaft, said auxiliary transmission mean including means carried by the frame selectively movable into and out of engaged relationship with companion parts of said auxiliary transmission means whereby the power for operating said auxiliary transmission means is derived from said power shaft only when said means is in engaged relationship.

18. The combination as set forth in claim 17 in which said auxiliary transmission means includes one or more stages of gear reduction whereby the sensitive adjustment is achieved by controlling the time of engagement of said selectively movable means.

19. In a variable ratio transmission mechanism having a frame and a power shaft, the combination therewith of an axially slidable pulley section rotatably coupled to the power shaft; said pulley section having a lead screw follower; a lead screw engaged with said lead screw follower; means rotatable with the power shaft supporting said lead screw for rotation about an axis spaced from said power shaft; the axial position of said lead screw being fixed whereby rotation of said lead screw about its own axis serves to adjust the axial position of said pulley section; a planetary gear carried by said lead screw; a pair of auxiliary transmissions between said power shaft and said planetary gear and respectively including ring gears engageable with the inner and outer elements of said planetary gear whereby the power for operating said auxiliary transmissions is derived from said power shaft.

20. The combination as set forth in claim 19 in which said auxiliary transmission means includes one or more stages of gear reduction whereby the sensitive adjustment is achieved by controlling the time of engagement of said selectively movable means.

21. In a variable ratio transmission mechanism having a frame and a power shaft, the combination therewith of an axially slidable pulley section rotatably coupled to the power shaft; said pulley section having an exteriorly threaded hub; a collar journalled on the shaft and having interior threads engaging said hub; means fixing the axial position of said collar whereby relative rotation between said collar and said power shaft serves to adjust the axial position of said pulley section; a driver carried by said shaft for rotation therewith; said driver having a set of gear teeth; said collar having two sets of gear teeth; a first idler gear assembly movably mounted by the frame and having pinions respectively engageable with the set of gear teeth of the driver and one of the sets of gear teeth of the collar upon movement of said assembly in one direction; spring means urging said first idler gear assembly to retracted disengaged position; a second idler gear assembly movably mounted by the frame and having pinions respectively engageable with the set of gear teeth of the driver and the other of the sets of gear teeth of the collar upon movement of said second idler gear assembly in one direction; spring means urging said second idler gear assembly to a retracted disengaged position; said driver including parts releasably connected together by a torque limiting structure; said gear sets having numbers of teeth designed to impart opposite relative movement between the collar and the shaft upon coupling through the corresponding idler gear assemblies.

22. In a variable ratio transmission mechanism having a frame and a power shaft, the combination therewith of an axially slidable pulley section rotatably coupled to the power shaft; said pulley section having an exteriorly threaded hub; a collar journalled on the shaft and having interior threads engaging said hub; means fixing the axial position of said collar whereby relative rotation between said collar and said power shaft serves to adjust the axial position of said pulley section; a driver carried by said shaft for rotation therewith; said driver having a set of gear teeth; an intermediate transmission member journalled on the shaft; said intermediate transmission member having two sets of gear teeth; a first idler gear assembly movably mounted by the frame and having pinions respectively engageable with the set of gear teeth of the driver and one of the sets of gear teeth of the intermediate transmission member upon movement of said assembly in one direction; spring means urging said first idler gear assembly to a retracted disengaged position; a second idler gear assembly movably mounted by the frame and having pinions respectively engageable with the set of gear teeth of the driver and the other of the sets of gear teeth of the intermediate transmission member upon movement of said second idler gear assembly in one direction; spring means urging said second idler gear assembly to a retracted disengaged position; said driver including parts releasably connected together by a torque limiting structure; said gear sets having numbers of teeth designed to impart opposite relative movement between the intermediate transmission member and the shaft upon coupling through the corresponding idler gear assemblies; and a gear reduction mechanism connected between the intermediate transmission member and said collar.

23. The combination as set forth in claim 22 in which said gear reduction mechanism includes a pair of planetary gears carried by said intermediate transmission member, and gears carried respectively by the power shaft and said collar both engaged by said planetary gears but having a slightly different number of teeth.

24. The combination as set forth in claim 22 in which said gear reduction mechanism includes a pair of gears carried respectively by the power shaft and said collar having a slightly different number of teeth, a floating oversized ring gear engaging corresponding elements of both the collar and shaft carried gears, and means carried by said intermediate transmission member for causing the ring gear to track as the intermediate transmission member is moved relative to said power shaft.

25. In a variable ratio transmission mechanism having a frame and a power shaft, the combination therewith of an axially slidable pulley section rotatably coupled to the power shaft; said pulley section having a hub; a pair of lead screws engaged with the hub; a mounting member for the lead screws rotatably coupled to the shaft and carried by the shaft at an axially fixed position adjacent the end of said hub; planetary gears carried by said lead screws; a first non-rotary ring gear carried by said frame and movable into and out of engagement with the ouside elements of said planetary gears; spring means urging said first ring gear to a retracted disengaged position; a second non-rotary ring gear carried by the frame and located inside the first ring gear and separately movable into and out of engagement with the inside elements of said planetary gears; spring means urging said second ring gear to a retracted disengaged position; each of said ring gears including parts releasably connected together by torque overload parts.

26. In a variable ratio transmission mechanism having a frame and a power shaft, the combination therewith of an axially slidable pulley section rotatably coupled to the power shaft; said pulley section having a hub; a pair of lead screws engaged with the hub; a mounting member for the lead screws rotatably coupled to the shaft and carried by the shaft at an axially fixed position adjacent the end of said hub; planetary gears carried by said lead screws; a first ring gear member journalled on said mounting member and engaging the outside elements of said planetary gears; a second ring gear member journalled on said power shaft and engaging the inside elements of said planetary gears; and selectively operable means carried by said frame for selectively retarding one of said ring gear members.

27. The combination as set forth in claim 26 in which said selectively operable means comprises a pair of independently movable brake members carried by said frame and engageable with the ring gear members respectively.

28. The combination as set forth in claim 26 in which said selectively operable means includes a pair of supplemental gears on each of said ring gear members; a first idler gear assembly movably mounted on the frame and having a pair of pinions respectively engaging first supplemental gears of the respective ring gear members upon movement of the idler gear assembly in one direction for imparting relative rotation between said ring gear members in one direction; a second idler gear assembly movably mounted on the frame and having a pair of pinions respectively engaging second supplemental gears of the respective ring gear members upon movement of the said second idler gear assembly in one direction for imparting relative rotation between said ring gear members in the other direction; and spring means urging said idler gear assemblies to retracted disengaged positions.

29. In a variable ratio transmission mechanism having a frame and a power shaft, the combination therewith of an axially slidable pulley section rotatably coupled to the power shaft; an exteriorly threaded post carried by the frame and axially aligned with said power shaft; a collar threadedly mounted on the post; a thrust bearing between the collar and said slidable pulley section; said collar having peripherally formed ratchet teeth; a countershaft; an auxiliary transmission connected between the power shaft and the countershaft; said countershaft having a circular part located eccentrically on said countershaft; said auxiliary transmission including a pawl member having a mounting aperture between its ends fitting the said circular part and mounted thereon; a pawl shifter angularly movable about the axis of said countershaft; said shifter having an arm; spring means engaging said arm and determining a normal angular orientation of said pawl member; said pawl member having pawl elements adjacent opposite ends respectively describing orbital paths adjacent to but normally clearing the ratchet teeth of said collar; said arm being movable in opposite directions to shift the orbital path of one of said pawl elements whereby said path intersects the ratchet teeth for indexing the collar; and detent means for releasably holding the collar in an adjusted position.

30. The combination as set forth in claim 29 together with means for displaying exteriorly of the frame the axial position of said collar.

31. In a variable ratio transmission mechanism having a frame, a power shaft and a member rotatably coupled to the shaft, said member being movable along the shaft for adjusting the ratio of transmission, the combination therewith of:
 (a) reversible auxiliary drive means;
 (b) means connecting the drive means between the member and to the shaft for moving the member along the shaft in accordance with the direction of movement of the drive means;
 (c) control means for the drive means, and determining three modes of operation of said drive means including forward, reverse and stop or idle;
 (d) means selectively operable during rotation of said shaft for operating said control means whereby power for operatnig said drive means is derived from said power shaft.

32. The combination as set forth in claim 31 together with means for displaying the axial position of said member, including an indicator and a bearing interposed between the indicator and said member whereby said indicator is freed from the rotational movement of said member.

33. The combination as set forth in claim 32 in which said drive means includes stages of gear reduction designed to produce sensitive adjustment of said member.

34. The combination as set forth in claim 32 in which said drive means includes differential gear means normally rotatable with said shaft, and selectively operable friction drag means for retarding said differential gear means.

References Cited

UNITED STATES PATENTS

| 2,422,196 | 6/1947 | Heyer | 74—230.17 |
| 2,889,716 | 6/1959 | Doty | 74—230.17 XR |
| 3,250,141 | 5/1966 | Luenberger | 74—230.17 |

FOREIGN PATENTS

| 373,679 | 6/1932 | Great Britain. |

JAMES A. WONG, Primary Examiner